RE 25286

June 5, 1962  J. T. DE CARLE  3,037,425
BIFOCAL CORNEAL CONTACT LENS
Filed Nov. 18, 1957

INVENTOR:
John Trevor De Carle,
BY
Bair, Freeman & Molinare
ATTORNEYS.

United States Patent Office 3,037,425
Patented June 5, 1962

3,037,425
BIFOCAL CORNEAL CONTACT LENS
John Trevor de Carle, "La Casetta," Beech Drive,
Kingswood, England
Filed Nov. 18, 1957, Ser. No. 697,277
Claims priority, application Great Britain Apr. 9, 1957
1 Claim. (Cl. 88—54.5)

This invention is concerned with contact lenses of an improved type.

It is well known that most people after a certain age experience difficulty in seeing clearly both near and distant details. To overcome this it is common practice for one person to have two pairs of spectacles which correct the vision for "distance" and for "reading" respectively. Alternatively, a single pair is often used in which each lens is formed of two zones of different focal lengths adjusted for each person to correct his vision both for "distance" and "reading."

As far as I know there is no contact lens available commercially at the present time which is bifocal and, therefore able to correct by means of the same lens the vision for both "distance" and "reading." It is an object of this invention to provide such a contact lens.

According to the present invention the improved contact lens of the type described comprises a lens in which one zone is adapted to correct the "distance" vision of a patient and another zone is adapted to correct his "reading" vision.

Figure 1:
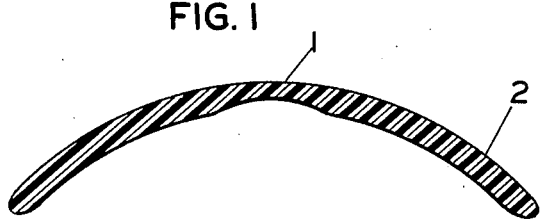
Figure 2:
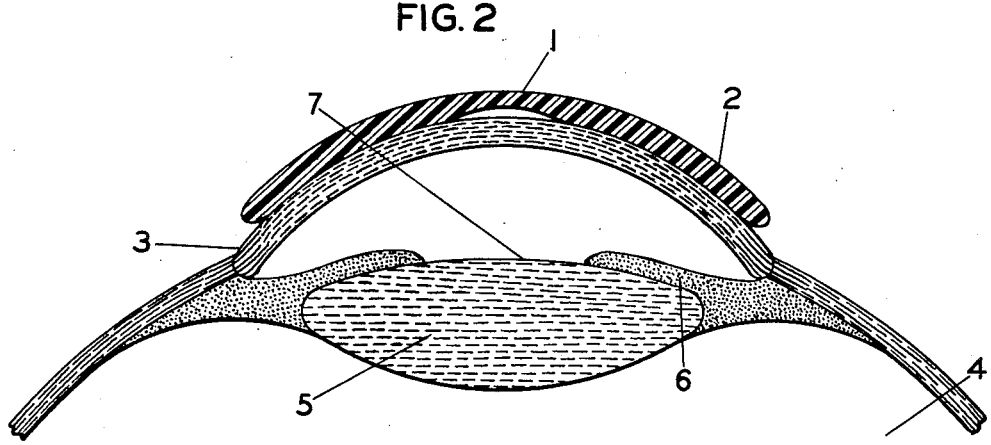

A preferred embodiment is illustrated in the accompanying diagrammatic drawings in which FIGURE 1 shows a lens according to the invention and FIGURE 2 shows the lens in position on the eye. The lens comprises a small zone 1 at the centre which is designed to correct the "distance" vision and an outer zone 2 which corrects the "reading" vision. It is applied to the cornea 3 of the eye 4, the lens of the eye being depicted at 5 with the iris at 6 and the pupil at 7. The area of the central zone 1 should in theory be equal to about half that of the pupil 7 under average lighting conditions but in practice a slightly larger "distance" zone than this is usually required because of lens movement on the eye. The greater the movement the larger the "distance" zone should be. The combined areas of the "reading" and "distance" zones 1 and 2 should be equal to or slightly larger than the largest size of the pupil 7.

In this embodiment the radius of curvature of the inner surface of the "reading" portion is made so that it fits the surface of the cornea in the usual way, while the radius of curvature of the inner surface of the "distance" portion is slightly smaller so that that portion stands slightly away from the eye.

The respective radii of curvature of the two zones of the lens are adjusted in accordance with the requirements of each particular patient and the material of which the lens is made. Allowance must also be made for the presence of the tear fluid between the lens and the eye, since this is of a different refractive index from the material of which the lens is constructed. When polymethyl methacrylate is used for making the lens it is found that the difference between the curvatures of the "distance" and "reading" portions and therefore the dioptral power must be about three and one-eighth times greater in air than that actually required in the eye.

The zones may be of various shapes and in various positions on the lens. For example they may be circular, oval or even semi-circular. They may be formed in the lens by grinding and polishing each zone to its appropriate curvature or by moulding or by fusing together glasses or plastics of different refractive index. When it is desired to have a zone in the centre of different radius of curvature from that of the outer zone this is usually obtained by grinding the inside or concave surface of the lens. It is also possible to have a third zone of intermediate focal length between the "distance" and "reading" zones which will provide for correct vision at about one metre from the eye, that is, between the "reading" and "distance" positions. The different zones can be polished so as to give a gradual change from one to the other without any sharp transition.

The invention may be applied to any known type of contact lens, providing that the optical system can be well centred and that the movement of the lens when fitted to the eye is slight.

It is quite surprising that the wearer of lenses made according to the present invention is able to see correctly both near and far details without consciously having to look in a different way for each, as he would with the known spectacle bifocal lenses. It appears that light reaches the retina all the time from both portions but when viewing distance the rays from the reading portion are so out of focus or ignored by the patient so that they do not interfere and vice versa.

I claim:

A bifocal corneal contact lens of generally concavoconvex form having a maximum external dimension smaller than the limbus of the eye of the patient to whom the lens is applied, said lens including a pair of concentric lens zones having a total area adapted to be only slightly greater than the largest normal area of the pupil of the eye, the central one of said lens zones being circular and having an area approximately half the area of the pupil under average lighting conditions so the patient can see simultaneously through both of said lens zones, the outer one of said lens zones having anterior and posterior curvatures to provide for the patient's prescribed vision at close range, the central lens zone having an anterior surface of the same curvature as said anterior surface of said outer lens zone, the posterior surface of said central lens zone being in the form of a spherical recess of shorter radius of curvature than the radius of curvature of the posterior surface of said outer lens zone and defining, together with the tear fluid filling said recess, the distance prescription for the patient, the curvature of the posterior surface of said outer lens zone substantially conforming to the curvature of the cornea of the eye to provide a relatively tight fit for keeping the lens centered on the eye and for minimal movement so the patient can see simultaneously through both of said lens zones for bifocal vision.

References Cited in the file of this patent
UNITED STATES PATENTS

| | | |
|---|---|---|
| 2,006,640 | Hubbell | July 2, 1935 |
| 2,129,305 | Feinbloom | Sept. 6, 1938 |
| 2,198,868 | Feinbloom | Apr. 30, 1940 |
| 2,274,142 | Houchin | Feb. 24, 1942 |
| 2,809,556 | Hornstein | Oct. 15, 1957 |

OTHER REFERENCES

"Sidelights on Refraction" (Williamson-Noble), Ophthalmological Society of the United Kingdom, vol. LXXVI, pages 633–647, 1956.